(12) United States Patent
Briggs et al.

(10) Patent No.: US 9,996,642 B2
(45) Date of Patent: Jun. 12, 2018

(54) METHOD AND APPARATUS FOR FINITE ANALYSIS PRE-PROCESSING

(71) Applicant: Brigham Young University, Provo, UT (US)

(72) Inventors: Jared C. Briggs, Payson, UT (US); C. Greg Jensen, Provo, UT (US); Chia Chi Teng, Provo, UT (US); W. Edward Red, Provo, UT (US)

(73) Assignee: Brigham Young University, Provo, UT (US)

( * ) Notice: Subject to any disclaimer, the term of this patent is extended or adjusted under 35 U.S.C. 154(b) by 799 days.

(21) Appl. No.: 14/489,255

(22) Filed: Sep. 17, 2014

(65) Prior Publication Data

US 2015/0081261 A1 Mar. 19, 2015

Related U.S. Application Data

(60) Provisional application No. 61/879,803, filed on Sep. 19, 2013.

(51) Int. Cl.
*G06F 17/50* (2006.01)

(52) U.S. Cl.
CPC ...... *G06F 17/5018* (2013.01); *G06F 2217/16* (2013.01)

(58) Field of Classification Search
None
See application file for complete search history.

(56) References Cited

U.S. PATENT DOCUMENTS

| | | | | |
|---|---|---|---|---|
| 6,560,570 | B1 * | 5/2003 | Dohrmann | G06F 17/17 703/1 |
| 2012/0317497 | A1 * | 12/2012 | Red | G06F 17/50 715/751 |
| 2014/0039847 | A1 * | 2/2014 | Georgescu | G06F 9/4881 703/1 |

OTHER PUBLICATIONS

Serban Georgescu, Software design for decoupled parallel meshing of CAD models, Sep. 30, 2013, IEEE, Pages All.*

* cited by examiner

*Primary Examiner* — Syed Roni
(74) *Attorney, Agent, or Firm* — Kunzler, PC

(57) ABSTRACT

A computer-implemented method for finite analysis pre-processing may include (1) receiving a processing request that identifies a geometries within a design space and a finite analysis pre-processing operation to be performed thereon, (2) determining an interface that is common to a first geometry and a second geometry of the geometries, and (3) conducting the finite analysis pre-processing operation on at least the interface between the first geometry and the second geometry previous to concurrently conducting the finite analysis pre-processing operation on an unprocessed portion of the first geometry and an unprocessed portion of the second geometry. Various other methods and systems are also disclosed herein.

18 Claims, 4 Drawing Sheets

METHOD AND APPARATUS FOR FINITE ANALYSIS PRE-PROCESSING

CROSS-REFERENCE TO RELATED APPLICATIONS

This application claims the benefit of U.S. provisional application 61/879,803 entitled "Architectural Framework for Cloud-based Multi-user, Finite Element Pre-processing" and filed on 19 Sep. 2013. The foregoing application is incorporated herein by reference.

BACKGROUND

Technical Field

The subject matter disclosed herein relates generally to systems and methods for finite analysis pre-processing.

Discussion of the Background

As part of any modern product design method, it is common practice to analyze a product before it is produced in order to predict whether it will perform according to the required design criteria. Products are commonly analyzed for conditions such as stress, strain, deflection, failure, heat and mass transfer conditions, etc. Unfortunately, the vast majority of products have geometries, materials, loads, environments, or a combination of these that are too complex to accurately model using simple, closed-form solutions. Therefore, methods have been developed to facilitate the numerical approximation of these products, thus enabling the computational simulation of their real-world performance. These include the Finite Difference, Finite Volume, and Finite Element methods, the uses of which are often very time-intensive—yet critical—in the product design process.

Modern engineering applications that facilitate the use of finite analysis pre-processing methods are currently limited to a single user and processing thread. This means that only a single engineer can work on an analysis model at a time using software that executes on a single processer, even in cases where the model is extremely large. For example, when a product is designed, a Computer-Aided Design (CAD) geometry model is delivered to a single analyst who de-features it, defines an appropriate mesh, refines the mesh, applies realistic boundary conditions, and then submits the simulation model to be solved—often to a High Performance Computing (HPC) cluster or other cloud-type environment. This serial workflow may cause the single-user preparation of analysis models to become a substantial bottleneck in the product design process. Although much research has been done to expedite the overall analysis process, pre-processing environments remain oriented toward a single user.

Given the foregoing, what is needed is additional and improved systems and methods for finite analysis pre-processing, in particular, systems and methods that facilitate multiple simultaneous users. The embodiments disclosed herein were developed in response to these issues.

SUMMARY OF THE INVENTION

As will be described in greater detail below, the subject matter disclosed herein describes various systems and methods for finite analysis pre-processing. In one example, a computer-implemented method for finite analysis pre-processing may include (1) receiving a processing request that identifies geometries within a design space and a finite analysis pre-processing operation to be performed thereon, (2) determining an interface that is common to a first geometry and a second geometry of the geometries, and (3) conducting the finite analysis pre-processing operation on at least the interface between the first geometry and the second geometry previous to concurrently conducting the finite analysis pre-processing operation on an unprocessed portion of the first geometry and an unprocessed portion of the second geometry.

The finite analysis pre-processing operation may include meshing of edges, faces, regions, and volumes, importing geometries, and transforming nodes. Such operations may be done with or without user interaction. Other examples that typically include user interaction include geometry simplification and refinement, correcting geometry topology, editing boundary conditions, assigning material conditions and properties, creating geometries for multi-disciplinary design optimization, creating geometries for design variational studies, and correcting mesh anomalies.

In some examples, the computer-implemented method may further include conducting the finite analysis pre-processing operation on another geometry of the geometries concurrent with conducting the finite analysis pre-processing operation on the interface. In some examples, the computer-implemented method may further include assigning the first geometry to a first processing instance of the finite analysis pre-processing operation and the second geometry to a second processing instance of the finite analysis pre-processing operation. In various embodiments of the method, processing instances may be executed by processors or arrays of processors in various configurations. For example, the first processing instance and the second processing instance may be executed on the same processor or array of processors. In another example, the first processing instance and the second processing instance may be executed on different processors or arrays of processors.

In some examples, determining the interface may include identifying at least one shared feature, such as a shared point, shared edge, shared face, or shared volume. In some examples, determining the interface may include identifying a plurality of shared features selected from: (1) shared points, (2) shared edges, (3) shared faces, and/or (4) shared volumes.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
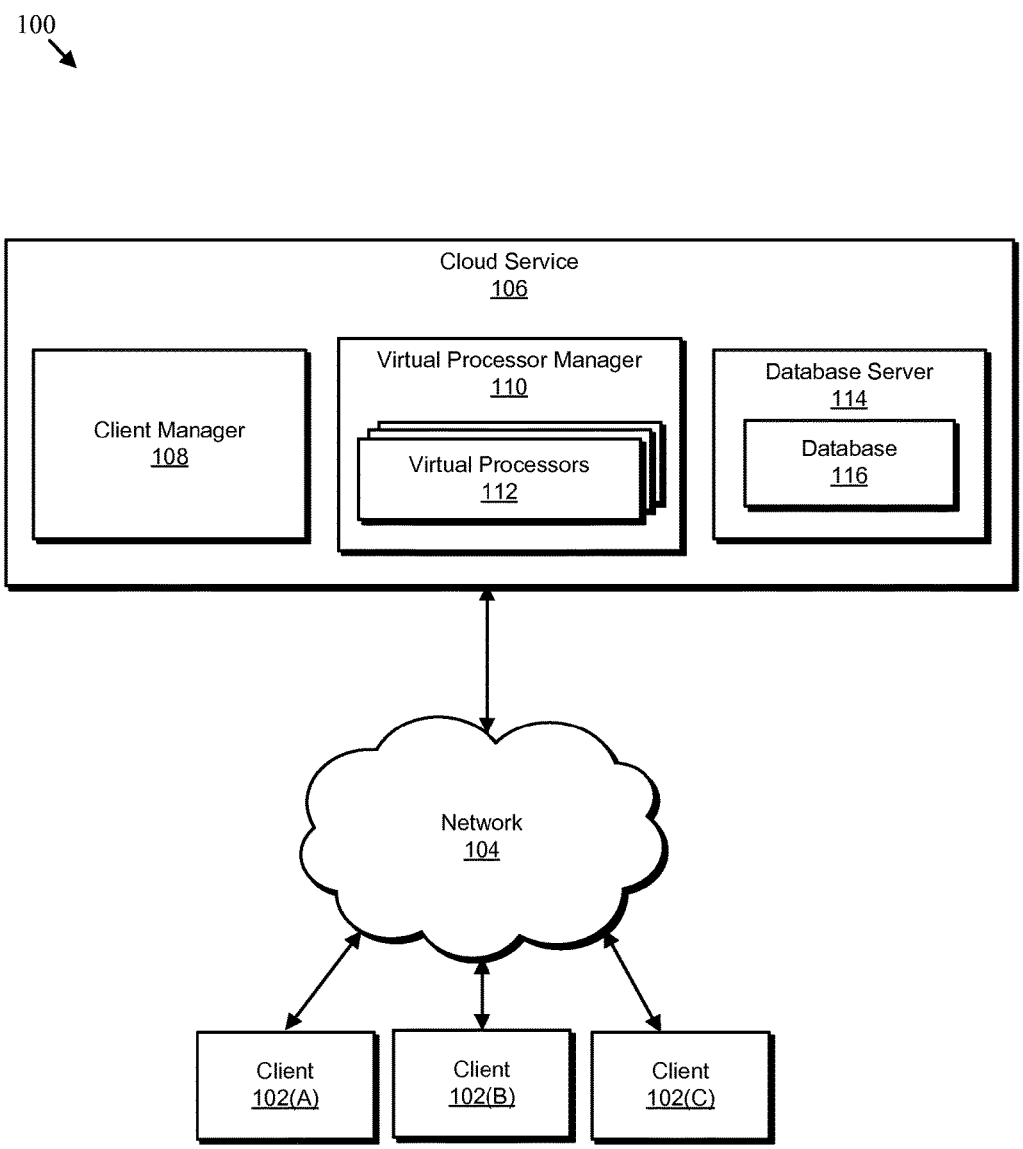
FIG. 1 is a schematic drawing of a system for finite analysis pre-processing.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, enable the module to achieve the intended purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present disclosure is generally directed to systems and methods for finite analysis pre-processing. As used herein, the term "finite analysis" generally refers to finite difference, finite volume, finite element and all other related numerical finite methods. As will be explained in greater detail below, the systems and methods described herein may facilitate multiple processing instances (and potentially multiple engineers) working on the same finite analysis model at the same time, thereby shortening design cycle times.

Figure 2:
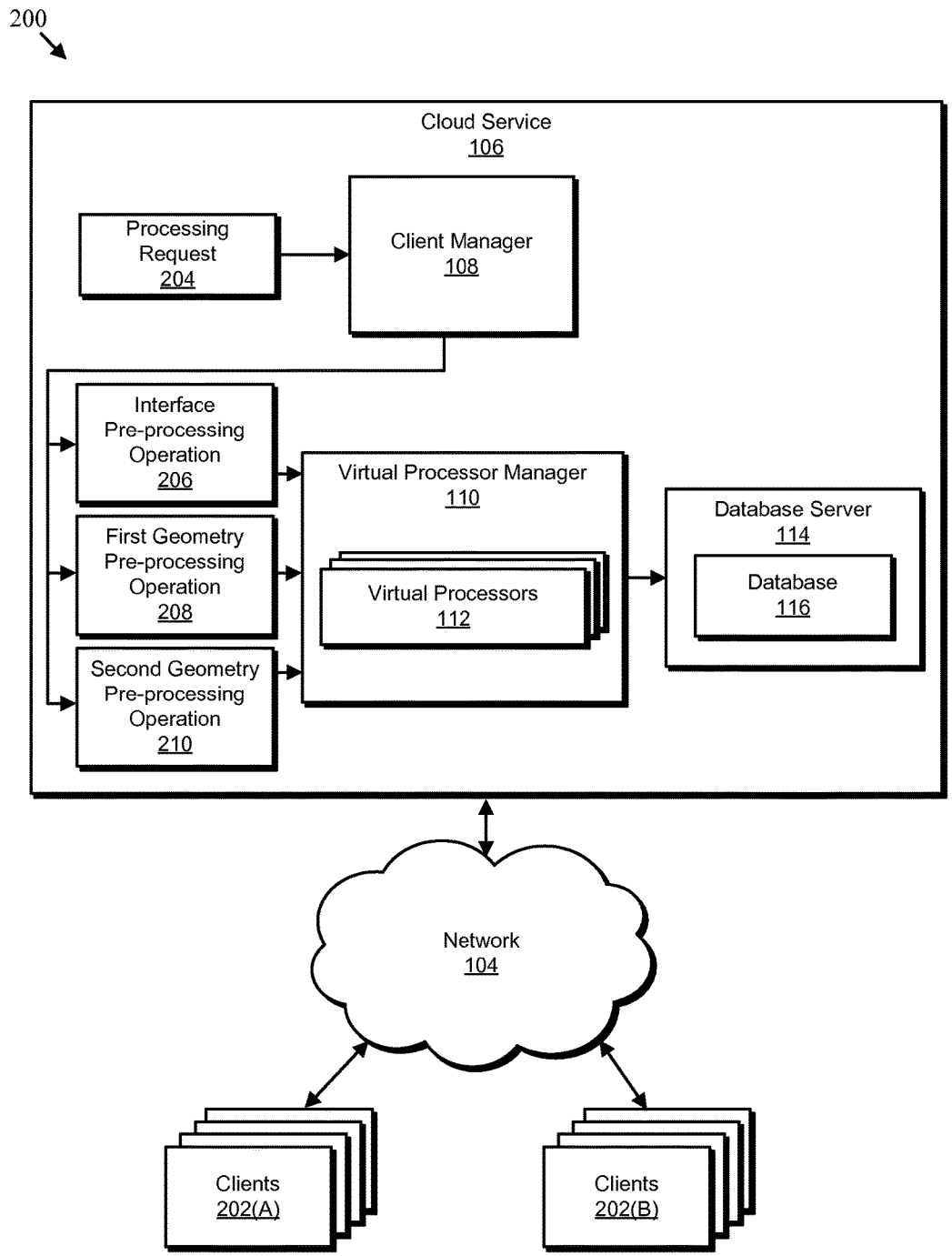
FIG. 2 is a functional block diagram depicting one embodiment of the system for finite analysis pre-processing.
Figure 3:
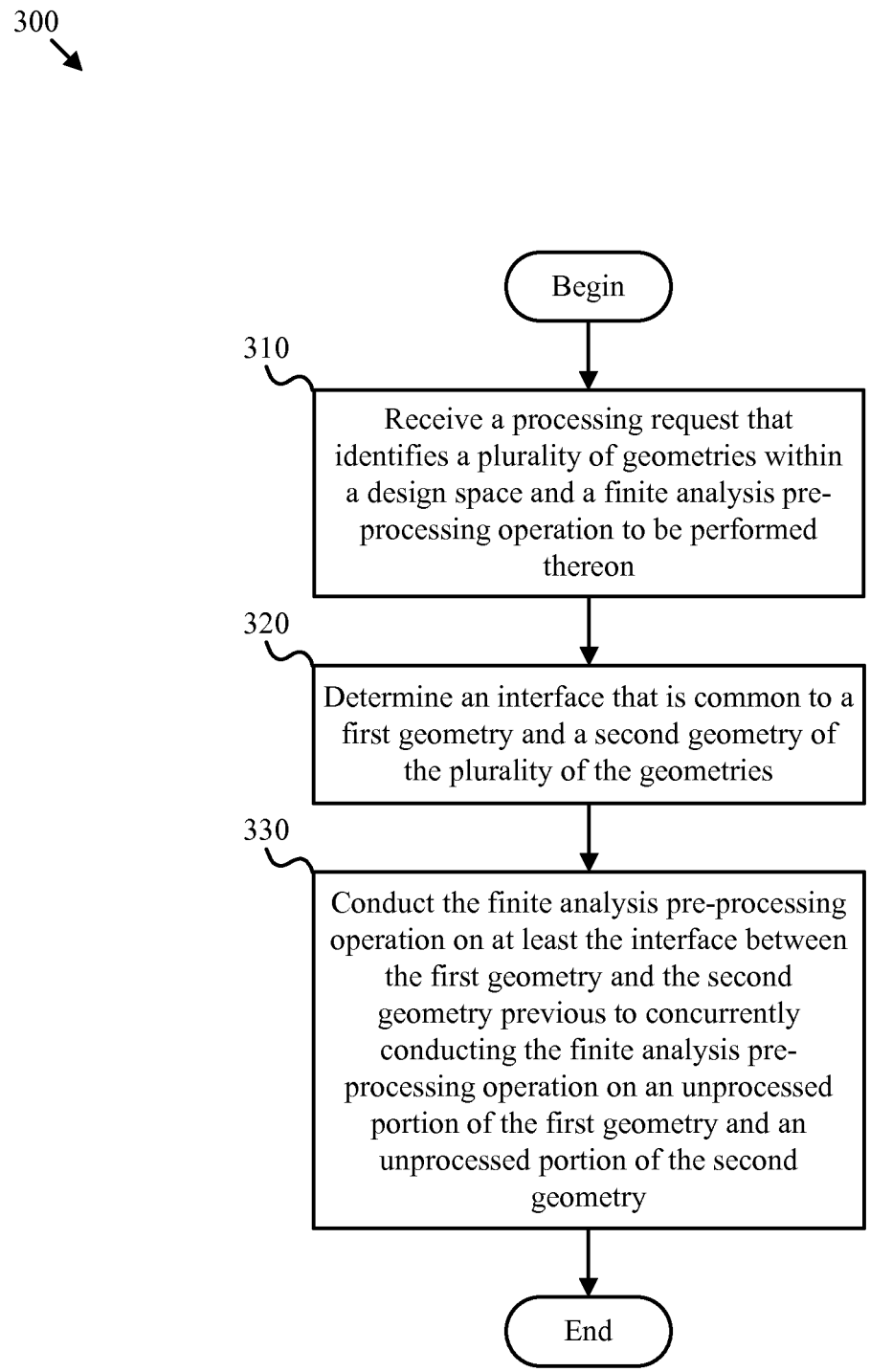
FIG. 3 is a flowchart depicting one embodiment of a method for finite analysis preprocessing.
Figure 4:
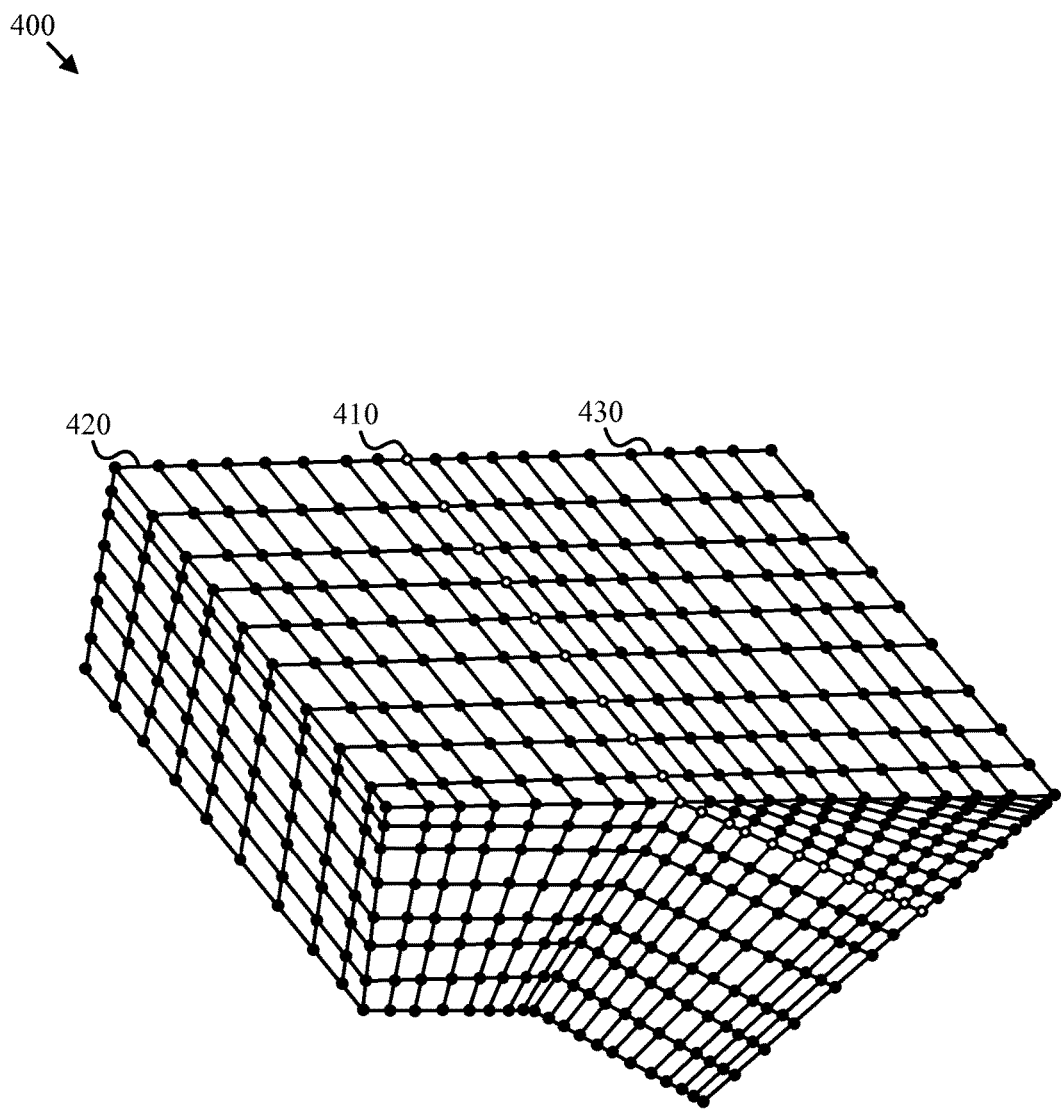
FIG. 4 depicts an example of determining a common interface of two geometries.

The following will provide, with reference to FIGS. 1, 2 and 4, detailed descriptions of exemplary systems for finite analysis pre-processing. Detailed descriptions of corresponding computer-implemented methods will also be provided in connection with FIG. 3.

FIG. 1 is a schematic drawing of an environment 100 wherein finite analysis pre-processing may be deployed. As illustrated in this figure, environment 100 may include one or more clients 102, a network 104, and a cloud service 106. Cloud service 106 may include one or more computing systems, such as client manager 108, virtual processor manager 110, and database server 114.

Clients 102 generally represent any type or form of computing device capable of reading computer-executable instructions. Examples of clients 102 include, without limitation, laptops, tablets, desktops, servers, combinations of one or more of the same, or any other suitable computing device.

Cloud service 106 generally represents any type or form of computing device or combinations of computing devices that is capable of storing, comparing, and/or providing data, as well as providing back-end processing services. Cloud service 106 may represent a commercial or publicly-accessible service or a service provided to a single organization. Examples of cloud service 106 include, without limitation high-performance clusters, virtual machines, application servers, web servers, and/or database servers configured to provide various database services and/or run software applications, or combinations of one or more of the same.

In certain embodiments, cloud service 106 may represent combinations of software applications and physical computing systems configured to perform various tasks. For example, cloud service 106 may include client manager 108, virtual processor manager 110 that manages a set of one or more virtual processors 112, and a database server 114 that manages one or more databases, such as database 116. In one example, database 116 may be configured to store geometry, material, load, and/or environment data representing one or more design models. Database 116 may represent portions of a single database or computing device or a plurality of databases or computing devices capable of being accessed by computing devices included in cloud service 106 and/or clients 102.

Network 104 generally represents any medium or architecture capable of facilitating communication or data transfer. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 104 may facilitate communication or data transfer using wireless or wired connections. In one embodiment, network 104 may facilitate communication between clients 102 and cloud service 106.

FIG. 2 is a functional block diagram depicting one embodiment of a finite analysis pre-processing system 200 that includes two groups of clients 202(A) and 202(B) that may represent groups of client computing systems allocated to separate design groups or to subsystems of a single design model. Database server 114 may maintain separate databases or database partitions for each group of clients 202. This approach may prove advantageous when the cloud service provides services to multiple organizations, groups within a single organization, or for multiple projects. In addition to maintaining data separation and integrity, database management functions may more closely mirror project management operations. Maintaining separate databases or database partitions may also fulfil legal requirements, for example for restrictions required under International Traffic in Arms Regulations (ITAR).

Client manager 108 may, as part of cloud service 106, receive processing request 204 from one of the clients 202. As will be described in greater detail below, client manager 108 may determine an interface that is common to a first geometry and a second geometry included in processing request 204. After identifying the common interface of the geometries, client manager 108 may submit interface pre-processing operation 206 to perform the operation included in processing request 204 on the common interface to the first and second geometries to virtual processor manager 110. After the operation is performed on the common interface to the first and second geometries, client manager 108 may then submit pre-processing operations 208 and 210 included in processing request 204 to be performed on the first and second geometries. First geometry pre-processing operation 208 and second geometry pre-processing operation 210 may be performed concurrently. Virtual processor manager 110 may allocate pre-processing operations 206, 208, and 210 to separate virtual processors 112 to perform the requested operations. Upon completion of the pre-processing operations, virtual processor manager 110 may request database server 114 to update database 116 with the results of the requested operations.

FIG. 3 is a flowchart depicting one embodiment of a finite analysis pre-processing method 300. The steps shown in FIG. 3 may be performed by any suitable computer-executable code and/or computing system. In some embodiments, the steps shown in FIG. 3 may be performed by one or more of the components of system 100 in FIG. 1 or system 200 in FIG. 2.

As illustrated in FIG. 3, at step 310 of method 300, one or more of the systems described herein may receive a processing request that identifies a plurality of geometries within a design space and a finite analysis pre-processing operation to be performed thereon. For example, at step 310 client manager 108 may receive processing request 204 from one of clients 202 that identifies two or more geometries and a finite analysis pre-processing operation to be performed on the geometries.

Clients 202 may receive and display geometry data from the cloud service or from a direct connection to the design database. Clients 202 may also receive input from users and package the input as commands to be submitted to the cloud service. Clients 202 may also maintain a local database containing a portion of the complete design database. Maintaining a local database may improve the overall responsiveness of the system and save user input in the event of network or server failure. Because the functions performed by clients 202 are relatively limited, clients 202 may be "thin clients" or commodity computer workstations without any unusual requirements for processor speed, memory, storage, or graphics processing.

Client manager 108 may manage connections with clients 202, authenticates users, receives processing requests, and validates client rights to perform requested operations on the specified elements. Client manager 108 may also transmit the results of processing requests to clients 202, after the requested operations have been completed.

The finite analysis pre-processing operation may take a variety of forms. In some examples, the finite analysis pre-processing operation may include importing geometries. As used herein, the phrase "importing geometries" generally refers to reading design data stored in a standard or commonly-recognized file format, such as Initial Graphics Exchange Specification (IGES), International Organization for Standardization (ISO) 10303 Standard for the Exchange of Product model data (STEP), or stereolithography (STL). Client manager 108 may also import geometries from a CAD system or kernel database file. Importing geometries may further include finite analysis pre-processing operations performing geometry simplification and refinement and correcting geometry topology, such as removing small or insignificant artifacts such as fillets, chamfers, small holes, non-structural components, and any other artifact that does not contribute to the intent of the analysis. In some examples, the finite analysis pre-processing operation may include creating geometries for multi-disciplinary design optimization.

In some examples, the finite analysis pre-processing operation may include meshing of edges, faces, regions, and volumes. As used herein, the term "meshing" generally refers to discretizing the domain of a design space in order to break up a complex geometry into smaller shapes or elements whose closed-form solutions are known (such as 1D rigid bars, beams, springs, 2D triangles and quadrilaterals, 3D tetrahedra, hexahedra, and pentahedra, or prisms and pyramids), thus rendering the analysis easier to perform by summing solutions of the set of smaller problems. Meshing creates both nodes and elements, where elements are made up of neighboring groups of nodes. In some examples, the finite analysis pre-processing operation may include correcting mesh anomalies and/or transforming/translating nodes.

In some examples, the finite analysis pre-processing operation may include editing boundary conditions. As used herein, the phrase "editing boundary conditions" generally refers to applying to nodes and/or elements of the mesh constraints or places of prescribed displacement and heat/energy sinks/sources. The application of boundary conditions may include loads such as structural loads, displacements, temperatures, pressures, heat/mass flows, etc. applied to nodes and/or elements of the mesh.

In some examples, the finite analysis pre-processing operation may include assigning material conditions and properties. As used herein, the phrase "assigning material properties" generally refers to applying to regions of the mesh properties such as density, Young's Moduli, Poisson's Ratios, etc. of the material with which each element is associated. Assigning material properties may also include defining section properties, such as beam, shell, or solid.

Returning to FIG. 3, at step 320 of method 300, one or more of the systems described herein may determine an interface that is common to a first geometry and a second geometry of the plurality of the geometries. For example, at step 320 client manager 108 may identify a common interface to geometries included in processing request 204.

Client manager 108 may identify interfaces common to geometries in a variety of ways. In some examples, determining the interface between the first and second geometries may include identifying at least one shared feature, such as a point, edge, face, or volume. In some examples, identifying a common interface may include identifying a plurality of shared features selected from shared points, shared edges, shared faces, and/or shared volumes.

FIG. 4 depicts an example 400 of a common interface comprising a shared face between two 3-dimensional parts. Example 400 depicts a mesh generated for modeling two parts joined by a cohesion layer, with nodes identified as dots connected by edges. The set of shared points 410 identified with open circles indicates a common interface representing the cohesion layer between part 420 and part 430.

Returning to FIG. 3, at step 330 of method 300, one or more of the systems described herein may conduct the finite analysis pre-processing operation on at least the interface between the first geometry and the second geometry previous to concurrently conducting the finite analysis pre-processing operation on an unprocessed portion of the first geometry and an unprocessed portion of the second geometry. For example, client manager 108 may submit interface pre-processing operation 206 to virtual processor manager 110, prior to submitting first geometry pre-processing operation 208 and second geometry pre-processing operation 210. For the model depicted in FIG. 4, client manager 108 may submit an interface pre-processing operation for interface 410 to virtual processor manager 110 before submitting pre-processing operations for parts 420 and 430. Virtual processor manager 110 may perform re-processing operations for parts 420 and 430 concurrently.

Client manager 108 may submit pre-processing operations to virtual processor manager 110 in a variety of ways. In some embodiments, method 300 may further include conducting the finite analysis pre-processing operation on another geometry of the plurality of geometries concurrent with conducting the finite analysis pre-processing operation on the interface. In some embodiments, method 300 may further include assigning the first geometry to a first processing instance of the finite analysis pre-processing operation and the second geometry to a second processing instance of the finite analysis pre-processing operation In some examples, virtual processor manager 110 provides an operation queue for submitting pre-processing operations for assignment to an instance of a virtual processor. The operation queue may be implemented as a priority queue that identifies pre-processing operations that must be completed before lower-priority operations begin processing. Virtual processor manager 110 may also provide a results queue that collects results from processing operations for distribution to clients and updating of the design database.

In some embodiments, virtual processor manager 110 maintains a pool of virtual processors 112 that are available to receive and perform pre-processing operation assignments. Maintaining a pool of available virtual processors may reduce the overhead of allocating memory and spawning processes and threads as each pre-processing operation is added to the operation queue. Over time, virtual processor manager 110 may adjust the number of virtual processors 112 available in the pool, to optimize throughput and resource utilization.

Virtual processor manager 110 may manage the pool of virtual processors 112 in a variety of ways. Although it may be possible to service the operation queue using a cluster of physical computing systems, one of skill in the art will recognize the throughput advantages associated with the use of virtual processors. Virtual processors 112 may consist of separate application program instances running on a single computing system or cluster of computing systems, each program instance having its own thread group and allocated memory. In other examples, virtual processors 112 may be virtual machines such as VMWARE ESX, MICROSOFT HYPER-V, or ORACLE VM SERVER. In some embodiments, the first processing instance and the second processing instance are executed on the same processor or array of processors. In some embodiments, the first processing instance and the second processing instance are executed on different processors or arrays of processors.

As described above, the systems and methods described herein may facilitate decomposing finite analysis pre-processing projects into separate operations that may be processed according to priority and, where possible, in parallel to facilitate the work of multiple simultaneous users. Systems and methods described herein may improve the overall throughput of the finite analysis pre-processing system, realize better utilization of human and computing resources, and reduce the time required to complete finite analysis projects.

In summary, the methods, apparatuses, and systems presented herein provide a number of distinct advantages over prior art methods, apparatuses, and systems. It should be noted that many of the functional units described herein are identified as modules. Others are assumed to be modules. One of skill in the art will appreciate that the various modules described herein may include a variety of hardware components that provide the described functionality including one or more processors such as CPUs or microcontrollers, or programmable logic devices (i.e., hardware components) that are configured by one or more software components. The software components may include executable instructions or codes and corresponding data that are stored in a computer-readable storage medium such as a non-volatile memory, or the like. The instructions or codes may include machine codes that are configured to be executed directly by the processor. Alternatively, the instructions or codes may be configured to be executed by an interpreter, or the like, that translates the instructions or codes to machine codes that are executed by the processor.

It should also be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for finite analysis pre-processing, executed by at least one processor, the method comprising:
   receiving, from a cloud service, a processing request that identifies a plurality of geometries within a design space and a finite analysis pre-processing operation to be performed thereon;
   determining an interface that is common to a first geometry and a second geometry of the plurality of the geometries;

conducting the finite analysis pre-processing operation on at least the interface between the first geometry and the second geometry;

conducting the finite analysis pre-processing operation on another geometry of the plurality of geometries concurrent with conducting the finite analysis pre-processing operation on the interface; and concurrently conducting the finite analysis pre-processing operation on an unprocessed portion of the first geometry and an unprocessed portion of the second geometry.

2. The method of claim 1, wherein the finite analysis pre-processing operation is meshing of edges, faces, regions, and volumes.

3. The method of claim 1, wherein the finite analysis pre-processing operation is geometry simplification and refinement.

4. The method of claim 1, wherein the finite analysis pre-processing operation is correcting geometry topology.

5. The method of claim 1, wherein the finite analysis pre-processing operation is creating or editing boundary conditions.

6. The method of claim 1, wherein the finite analysis pre-processing operation is assigning material conditions and properties.

7. The method of claim 1, wherein the finite analysis pre-processing operation is creating geometries for multidisciplinary design optimization.

8. The method of claim 1, wherein the finite analysis pre-processing operation is creating geometries for design variational studies.

9. The method of claim 1, wherein the finite analysis pre-processing operation is importing geometries.

10. The method of claim 1, wherein the finite analysis pre-processing operation is transforming nodes.

11. The method of claim 1, wherein the finite analysis pre-processing operation is correcting mesh anomalies.

12. The method of claim 1, further comprising assigning the first geometry to a first processing instance of the finite analysis pre-processing operation and the second geometry to a second processing instance of the finite analysis pre-processing operation.

13. The method of claim 12, wherein the first processing instance and the second processing instance are executed on a same processor or array of processors.

14. The method of claim 12, wherein the first processing instance and the second processing instance are executed on different processors or arrays of processors.

15. The method of claim 1, wherein determining the interface comprises identifying at least one shared edge.

16. The method of claim 1, wherein determining the interface comprises identifying at least one shared face.

17. The method of claim 1, wherein determining the interface comprises identifying at least one shared volume.

18. The method of claim 1, wherein determining the interface comprises identifying a plurality of shared features selected from:
   shared points;
   shared edges;
   shared faces;
   shared volumes.

* * * * *